(12) United States Patent
Chipman

(10) Patent No.: US 8,733,235 B1
(45) Date of Patent: May 27, 2014

(54) MULTIFUNCTIONAL COOKER SYSTEM

(76) Inventor: Donald I. Chipman, Mason City, IA (US)

( * ) Notice: Subject to any disclaimer, the term of this patent is extended or adjusted under 35 U.S.C. 154(b) by 278 days.

(21) Appl. No.: 13/327,726

(22) Filed: Dec. 15, 2011

(51) Int. Cl.
A47J 37/12 (2006.01)
B66D 1/60 (2006.01)

(52) U.S. Cl.
USPC ............... 99/339; 99/340; 99/410; 99/414; 126/25 R; 126/41 R

(58) Field of Classification Search
USPC .......... 99/340, 339, 407, 410, 403, 415, 414, 99/422, 445; 126/41 R, 275 R, 25 R
See application file for complete search history.

(56) References Cited

U.S. PATENT DOCUMENTS

| 987,386 | A | * | 3/1911 | MacKenzie | 126/275 R |
|---|---|---|---|---|---|
| 1,006,903 | A | * | 10/1911 | Bird | 126/275 R |
| 1,223,748 | A | | 4/1917 | Stockum | |
| 1,348,048 | A | | 7/1920 | Pfeffer | |
| 1,393,762 | A | | 10/1921 | Demuth | |
| 1,428,388 | A | | 9/1922 | Miller | |
| 1,625,999 | A | | 4/1927 | Irish | |
| 2,000,609 | A | * | 5/1935 | Pitman | 99/408 |
| 2,483,069 | A | * | 9/1949 | Snook | 126/376.1 |
| 3,722,498 | A | | 3/1973 | Kimbrough | |
| 4,454,805 | A | * | 6/1984 | Matthews | 99/400 |
| 5,454,297 | A | | 10/1995 | Phillips | |
| 5,862,741 | A | * | 1/1999 | Wodeslavsky | 99/340 |
| 5,873,298 | A | | 2/1999 | Chang | |
| 5,975,073 | A | * | 11/1999 | Kuo | 126/41 R |
| 6,006,658 | A | | 12/1999 | Siu | |
| 6,103,291 | A | | 8/2000 | Fernandez Tapia | |
| 6,262,398 | B1 | | 7/2001 | Busquets et al. | |
| 6,314,869 | B1 | | 11/2001 | Bourgeois, Jr. | |
| 6,401,602 | B1 | | 6/2002 | Lin | |
| 6,467,402 | B1 | * | 10/2002 | Khinkis et al. | 99/417 |
| 6,526,875 | B1 | | 3/2003 | Dzbinski | |
| 6,536,603 | B1 | | 3/2003 | Sollo | |
| 6,810,791 | B2 | | 11/2004 | Kijimoto | |
| 6,874,496 | B2 | * | 4/2005 | Waits et al. | 126/25 R |
| 6,962,106 | B2 | * | 11/2005 | Viraldo | 99/339 |
| 6,964,224 | B2 | | 11/2005 | Minamigawa | |
| 7,036,425 | B2 | | 5/2006 | Chang | |
| 7,059,240 | B2 | | 6/2006 | Kim | |
| 7,141,764 | B1 | | 11/2006 | Shumate | |
| 7,827,906 | B1 | | 11/2010 | Carter | |
| 8,067,716 | B1 | | 11/2011 | Lloyd | |
| 2002/0134250 | A1 | * | 9/2002 | Mosher et al. | 99/339 |
| 2003/0005828 | A1 | * | 1/2003 | McLemore et al. | 99/403 |
| 2008/0121117 | A1 | * | 5/2008 | Best | 99/339 |
| 2012/0237647 | A1 | * | 9/2012 | Dobert et al. | 426/243 |

* cited by examiner

Primary Examiner — Reginald L Alexander
(74) Attorney, Agent, or Firm — www.bobharter.com; Robert J. Harter

(57) ABSTRACT

A fuel-fired multifunctional cooker system is useable for deep frying, submerged cooking in water, steaming, griddle frying, grilling, double-boiler operation and simultaneous combinations thereof. Some examples of cooker system 4 include features such as a cylindrical flue with a perforated upper discharge ring plate for even heat distribution, a removable upper flue deflector ring (annular deflector) for shielding a user and creating an "air curtain" across the cooker system's upper food-receiving opening, an invertible griddle/grill cooktop with a central flue gas opening, an adjustable skewer, a steamer hood, an annular lower heat deflector around the burner, an annular flue gas baffle in the combustion chamber, a series of legs or feet creating a combustion air inlet between the floor and the cooker system's lower edge, a removable table, and a lifting device for handling one or more cooker components.

20 Claims, 13 Drawing Sheets

MULTIFUNCTIONAL COOKER SYSTEM

FIELD OF THE INVENTION

The subject invention generally pertains to cooking apparatus and more specifically to gas fired apparatus comprising a deep fat fryer and/or a steamer.

BACKGROUND

Deep fat fryers typically comprise a reservoir of hot oil in which various foods are submerged and cooked. Steamers cook food with steam or hot water vapor at temperatures typically lower than that of deep frying. A griddle is a generally flat hot surface upon which food items are cooked. A grill is similar to a griddle, but instead of a substantially flat hot surface, a grill has ridges that support and cook the food items. The ridges may be separated by openings, valleys, grooves or recessed areas.

DETAILED DESCRIPTION

Figure 1:
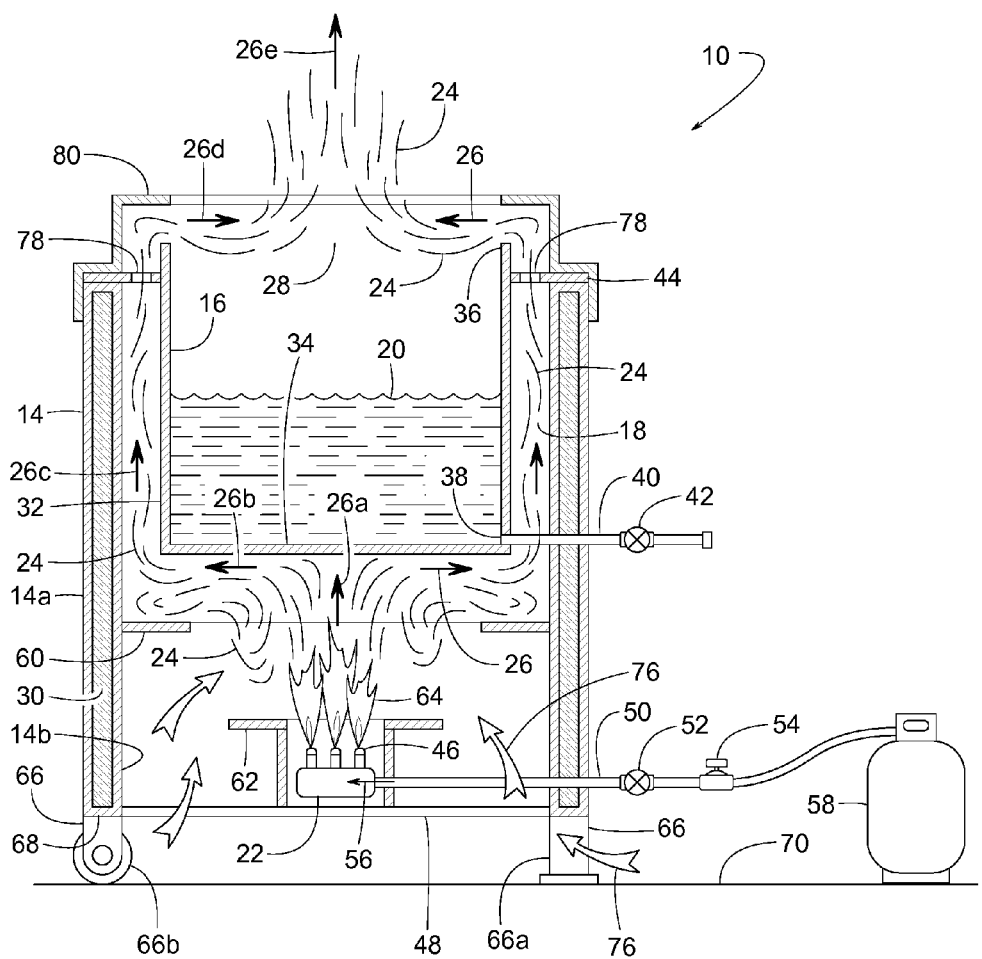
FIG. 1 is a cross-sectional side view of an example cooker.
Figure 2:
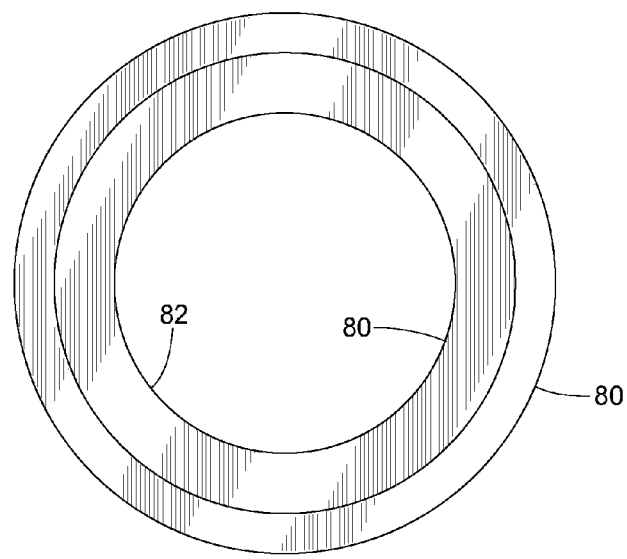
FIG. 2 is a view taken along line 2-2 of FIG. 3.
Figure 3:
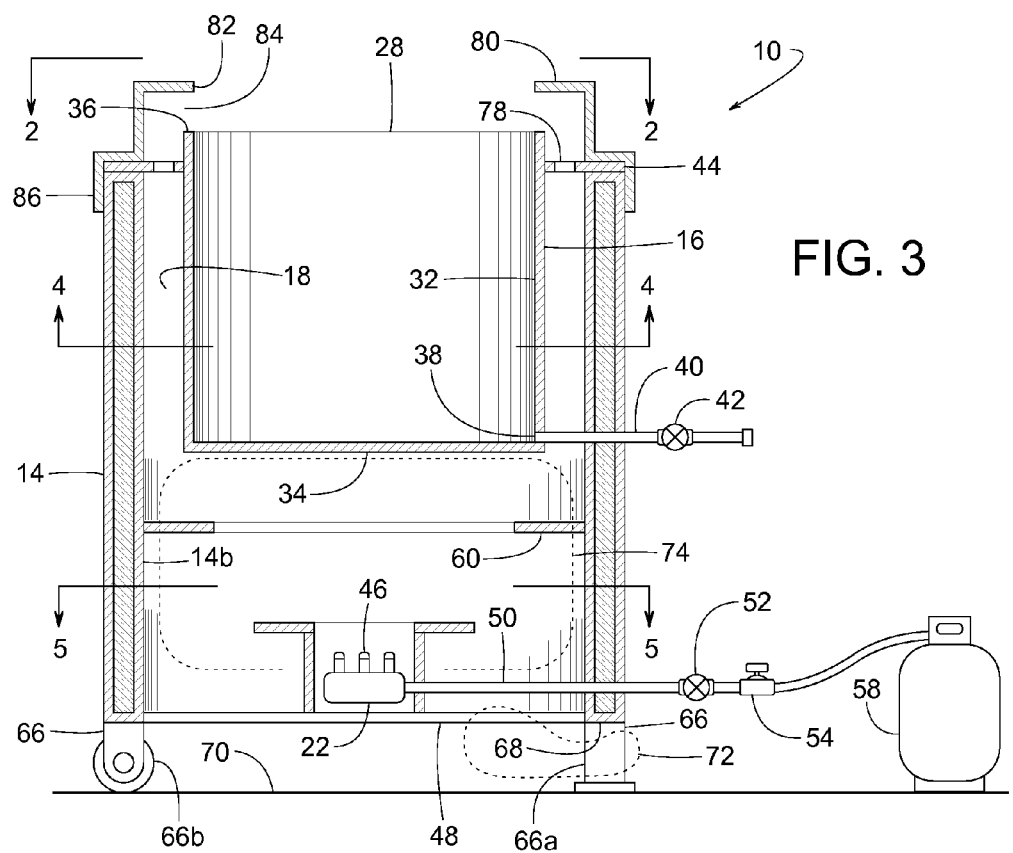
FIG. 3 is a cross-sectional view similar to FIG. 1 but showing the cooker turned off.
Figure 4:
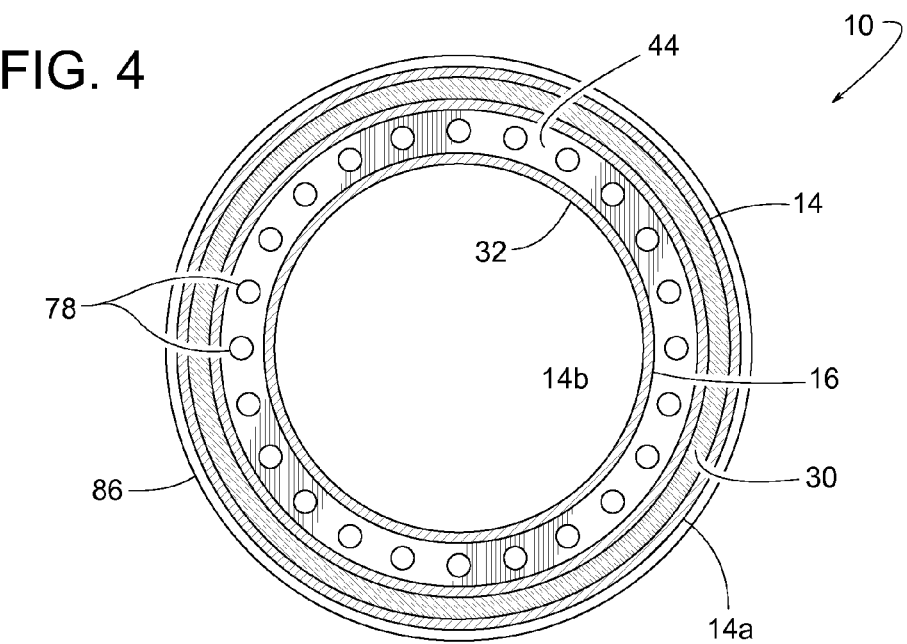
FIG. 4 is a cross-sectional view taken along line 4-4 of FIG. 3.
Figure 5:
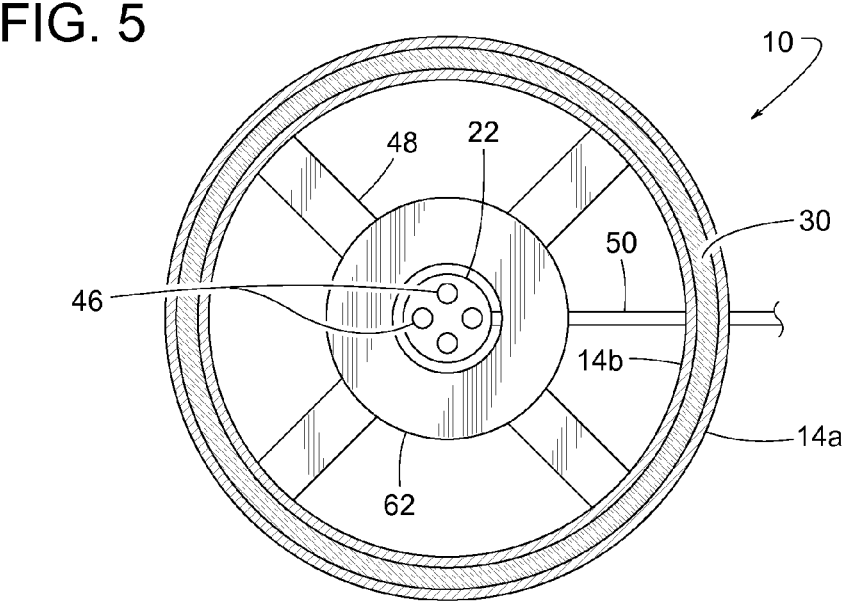
FIG. 5 is a cross-sectional view taken along line 5-5 of FIG. 3.

FIGS. 1-19 illustrate an example cooker 10 and/or various portions thereof. Cooker 10 can be used for cooking various food items 12 (e.g., meat, vegetables, pastries, bread, other grain products, milk/cheese products, eggs, pancakes and various combinations thereof, etc.). Cooker 10 can cook food items 12 in various ways including, but not limited to, deep frying, cooking in water, steaming, griddle frying and grilling.

In some examples, cooker 10 comprises an insulated outer shell 14 surrounding a reservoir 16, wherein shell 14 and reservoir 16 are generally concentric to create an approximately cylindrical annular flue 18 between reservoir 16 and shell 14. Reservoir 16 is for containing a fluid 20 (e.g., oil, water, etc.) heated by a burner 22 that is underneath reservoir 16. For even heat distribution, a current of hot flue gas 24 travels in a flow pattern 26 comprising a first upward path 26a toward reservoir 16 followed by a radially outward path 26b toward shell 14 followed by a second upward path 26c through annular flue 18 followed by a radially inward path 26d overlapping an upper food-receiving opening 28 of reservoir 16 followed by a third upward path 26e away from reservoir 16.

Although the actual structural design and uses of cooker 10 may vary, some examples of cooker 10 are as follows. Shell 14, in some examples, comprises a generally cylindrical outer wall 14a, a generally cylindrical inner wall 14c and a filling of thermal insulation 30 between walls 14a and 14b. Reservoir 16 comprises a generally cylindrical sidewall 32, a closed bottom 34, and an upper rim 36 that defines upper food-receiving opening 28 In some examples, reservoir 16 has a liquid opening 38 connected to a pipe 40 and a valve 42 that can be used for supplying or draining fluid 20 to or from reservoir 16. In the illustrated example, a ring plate 44 connects reservoir 16 to shell 14.

Below reservoir 16, cooker 10 includes burner 22 with at least one nozzle 46, a bracket 48 for supporting burner 22 relative to shell 14, a fuel line 50 with a shutoff valve 52 and a regulator 54 for conveying a fuel 56 (e.g., LP gas, propane, methane, natural gas, fuel oil, etc.) from a fuel source 58 to burner 22, an annular baffle 60 connected to inner wall 14b of shell 14, a heat deflector 62 encircling burner 22 and/or fuel-fed flame 64 (from burner 22), and a plurality of feet 66 extending downward from a lower edge 68 of shell 14 and/or bracket 48.

Feet 66 (e.g., legs 66a, wheels 66b, and combinations thereof) elevate the shell's lower edge 68 above a cooker-supporting surface 70 (e.g., floor, ground, etc.) to create a combustion air inlet 72 provided by the vertical gap between cooker-supporting surface 70 and the shell's lower edge 68. Combustion air inlet 72 leads to a combustion chamber 74 within cooker 10, wherein combustion chamber 74 is defined by the reservoir's bottom 34, the shell's inner wall 14b, and the shell's lower edge 68.

When cooker 10 is operating, ambient air 76 flows through combustion air inlet 72 into combustion chamber 74 to promote the burner's combustion of fuel 56 in the form of fuel-fed flame 64 directed upward toward a lower central region of reservoir 16. As mentioned earlier, the resulting flue gas 24 from combustion chamber 74 flows along flow pattern 26. Annular baffle 60 helps direct flue gas 24 from radially outward path 26b to second upward path 26c through annular flue 18. To evenly distribute flue gas 24 around annular flue 18, some examples of ring plate 44 include a plurality of holes 78 through which flue gas 24 flows from annular flue 18 toward radially inward path 26d.

In some examples, cooker 10 includes an annular deflector 80 that directs flue gas 24 exiting holes 78 along radially inward path 26d. Annular deflector 80 has a radially inner periphery 82, and reservoir 16 has upper rim 36. The radially inner periphery 82 and upper rim 36 define a flue gas discharge outlet 84 therebetween, wherein the flue gas discharge outlet 84 faces radially inward from annular deflector 80. Consequently, flue gas 24 flowing radially inward across (fully or partially across) upper food-receiving opening 28 may reduce a nearby cook's exposure to flue gas 24 and may, in effect, create a hot air curtain over the top of reservoir 16. To facilitate cleanup, some examples of annular deflector 80 are Teflon coated and readily removable from the rest of cooker 10. For instance, in the illustrated example, annular deflector 80 simply rests upon ring plate 44, and a downward extending flange 86 maintains the deflector's radial position relative to shell 14.

To minimize a cook's exposure to heat near the bottom of shell 14, heat deflector 62 shields cooker-supporting surface 70 from heat that might otherwise transfer from the reservoir's bottom 34 or from other areas within combustion chamber 74.

Figure 6:
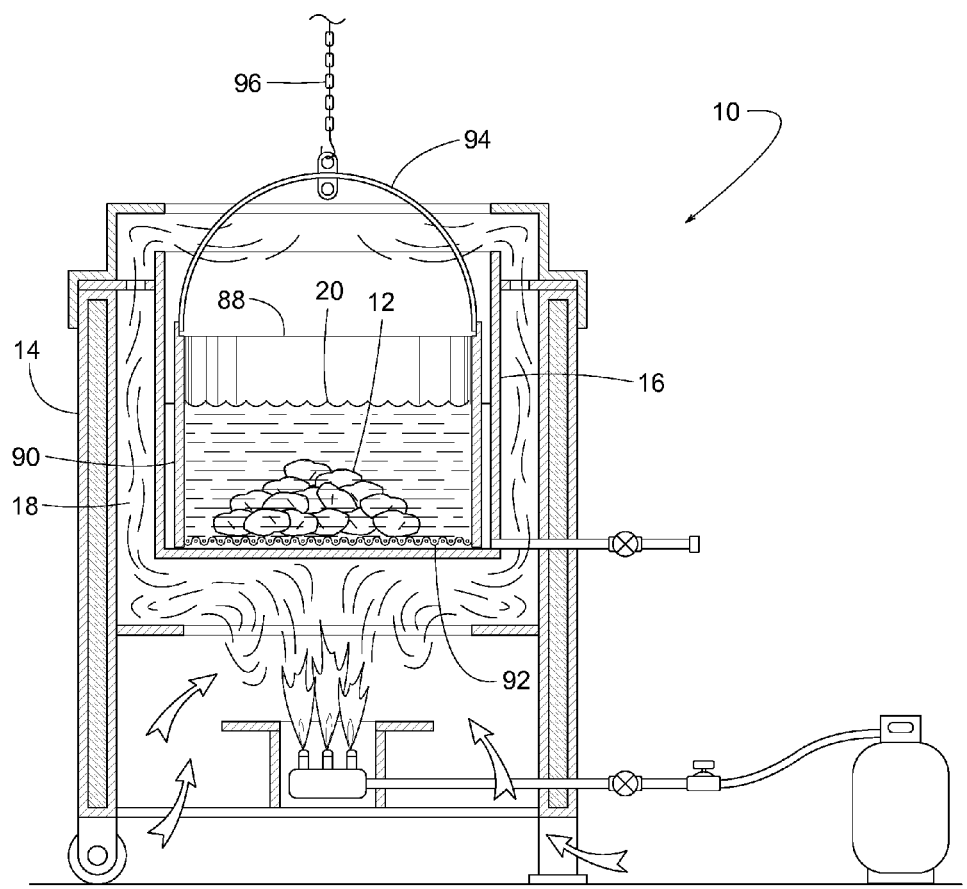
FIG. 6 is a cross-sectional view similar to FIG. 1 but also showing a food holder main bucket disposed within the cooker's reservoir.

FIGS. 6-19 illustrate various possible additional components and potential uses of cooker 10. FIG. 6, for example, shows a food holder 88 (e.g., a main bucket) for lowering food items 12 into reservoir 16. In the illustrated example, food holder 88 comprises a generally cylindrical wall 90 with a food-supporting surface 92 (e.g., a bucket bottom). Food-supporting surface 92 is fluid permeable to allow heated liquid 20 to flow in and out of food holder 90 as food holder 90 is lowered into or raised from within reservoir 16. Examples of food-supporting surface 92 include, but are not limited to, a screen, wire mesh, perforated metal, expanded metal, etc.). Food holder 90 includes a handle 94 that is pivotal between an operating position (FIG. 6) and a stored position (FIG. 10). Food holder 88 can be raised and lowered by hand directly or with the aid of a lifting device 96 (e.g., a chain, hoist, pivotal lever, hook and various combinations thereof, etc.). Submerging food items 12 cooks them via hot water heating or deep frying, depending on whether heated fluid 20 is water or oil, respectively.

Figure 7:
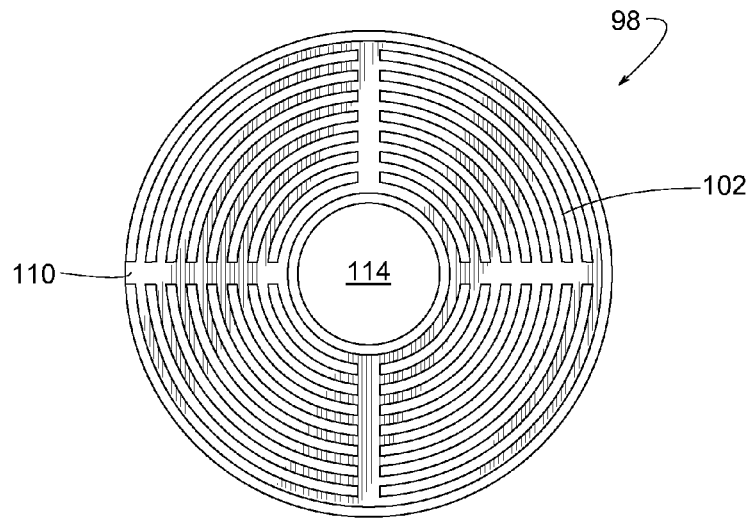
FIG. 7 is a top view of FIG. 8.
Figure 8:
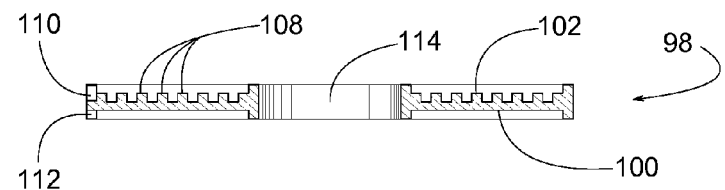
FIG. 8 is a cross-sectional side view of an example invertible cooktop.
Figure 9:
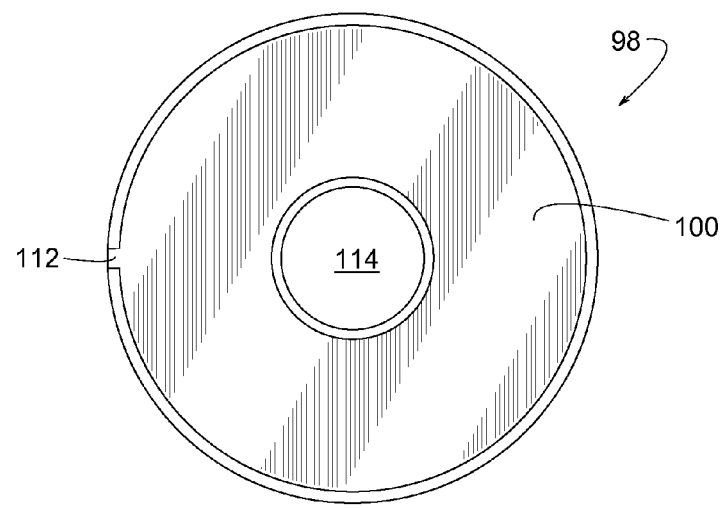
FIG. 9 is a bottom view of FIG. 8.
Figure 10:
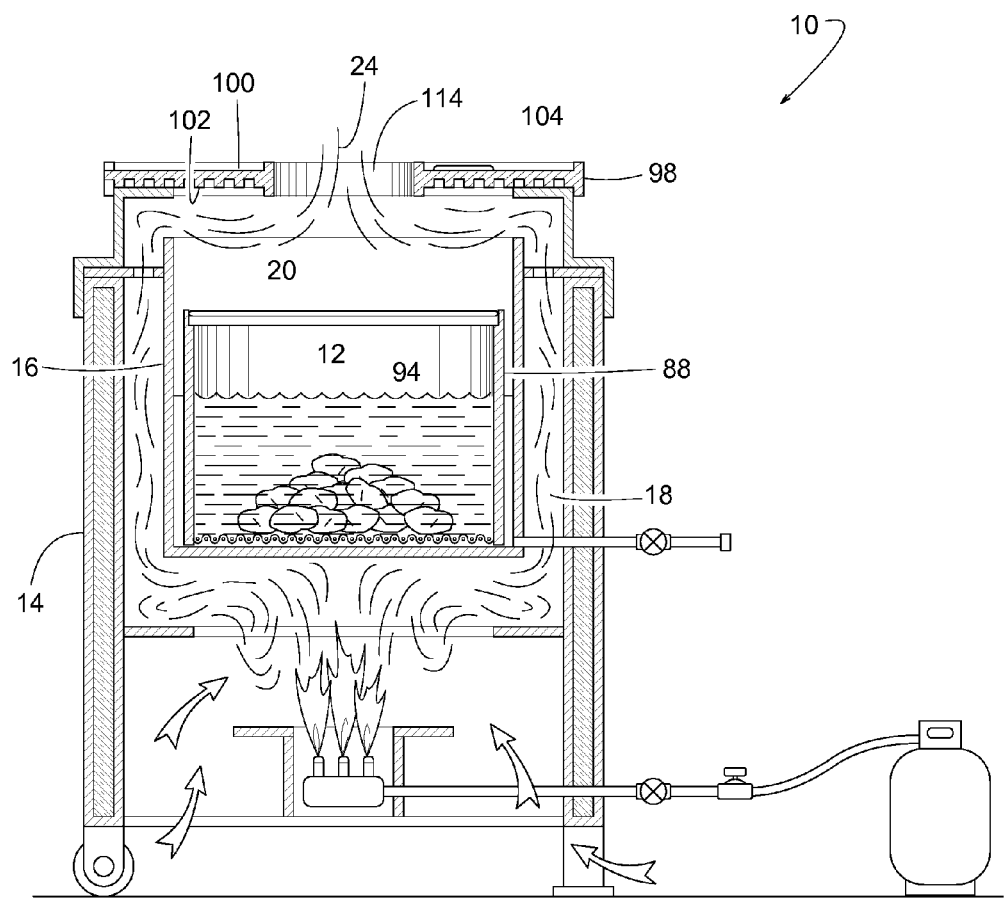
FIG. 10 is a cross-sectional view similar to FIG. 6 but showing the cooktop installed in its griddle position.
Figure 11:
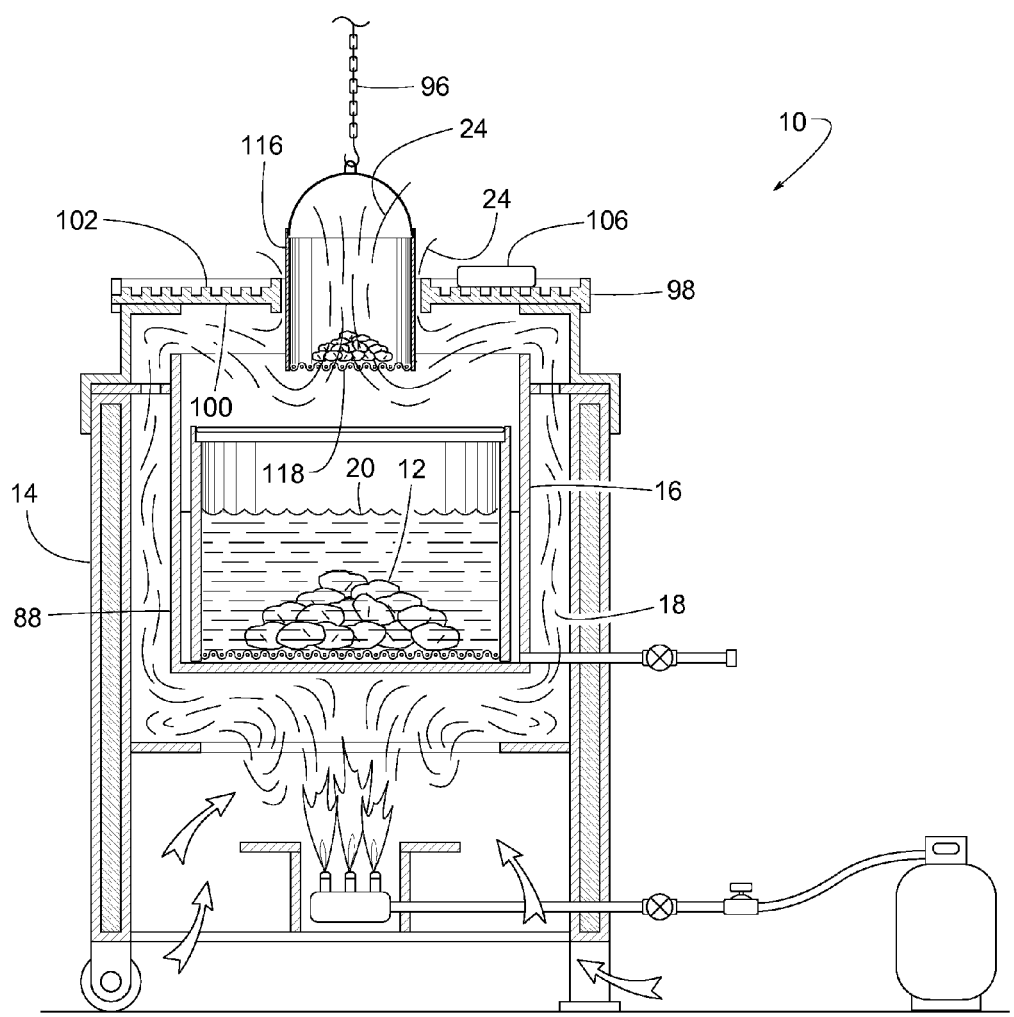
FIG. 11 is a cross-sectional view similar to FIG. 10 but showing a smaller food-containing bucket extending into a central hole of the cooktop.
Figure 12:
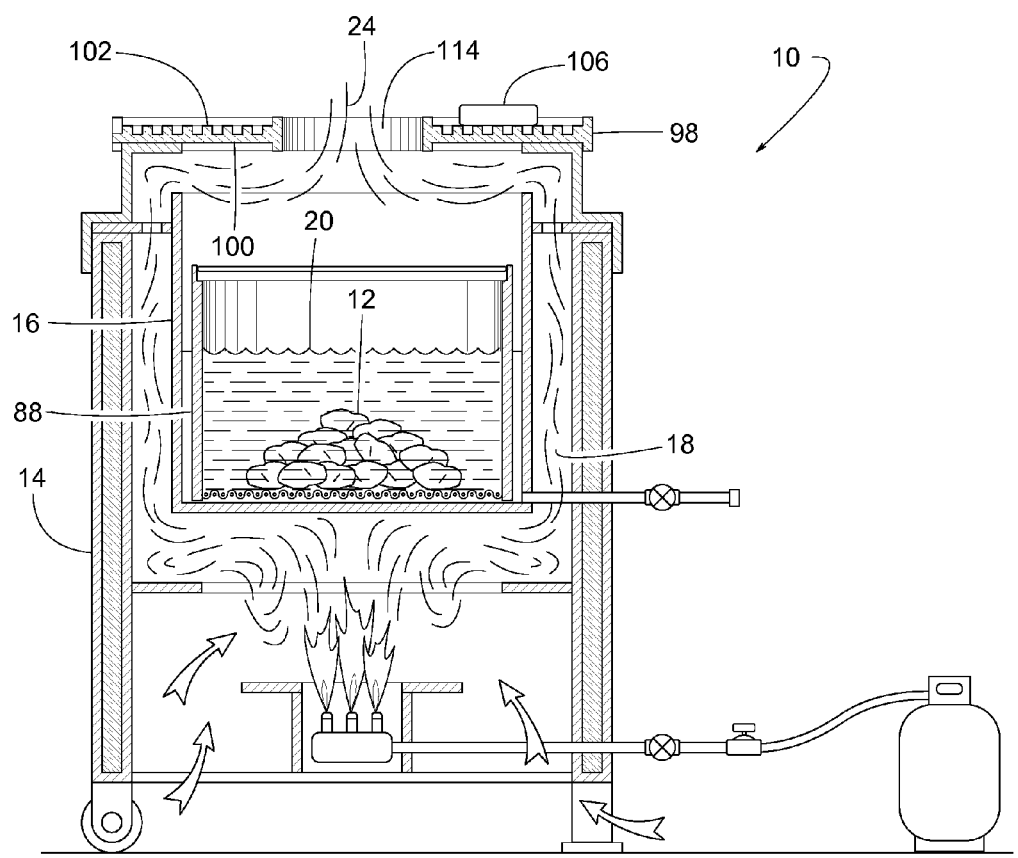
FIG. 12 is a cross-sectional view similar to FIG. 10 but showing the cooktop in its grill position.
Figure 14:
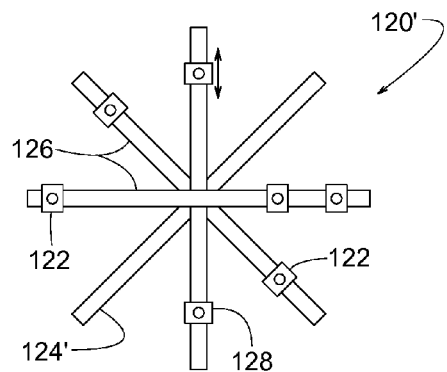
FIG. 14 is a top view of another example skewer assembly.
Figure 15:
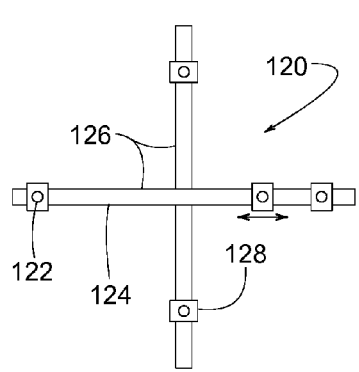
FIG. 15 is a top view of the skewer assembly in FIG. 13.
Figure 13:
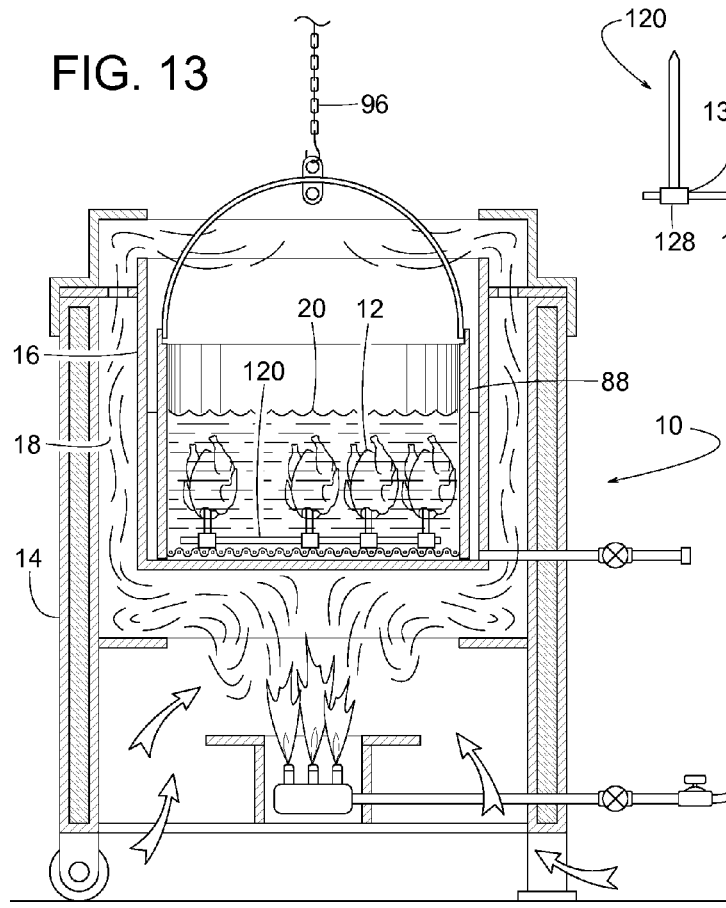
FIG. 13 is a cross-sectional view similar to FIG. 6 but further showing an example skewer assembly.
Figure 16:
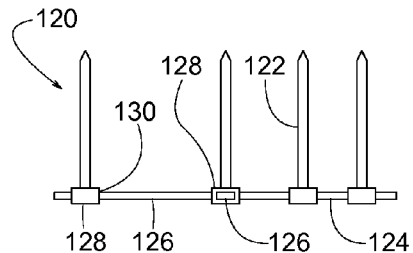
FIG. 16 is a side view of the skewer assembly in FIGS. 13 and 15.

FIGS. 7, 8 and 9 show an invertible cooktop 98 having a griddle side 100 and a grill side 102 on opposite facing sides of cooktop 98. Cooktop 98 can be placed on annular deflector 80 such that shell 14 supports the cooktop's weight. Cooktop 98 can be used in a grill position with grill side 102 facing up, as shown in FIG. 10, or cooktop 98 can be used in a griddle position with griddle 100 facing up, as shown in FIGS. 11 and 12. For illustration, FIG. 10 shows griddle side 100 being used for cooking a pancake 104, and FIG. 11 shows grill side 102 being used for cooking a steak 106.

Grill side 102 has a plurality of ridges 108 rendering grill side 102 less flat than the substantially smooth side of griddle side 100. To drain cooking fluids, grill side 102 and griddle side 100 have drain notches 110 and 112, respectively. Some examples of cooktop 98 include a central opening (e.g., a bucket-receiving opening 114) for releasing flue gas 24 out from within cooker 10 and/or for passing a smaller food-containing bucket 116 through opening 114, as shown in FIG. 11. When bucket 116 is within opening 114, as shown in FIG. 11, flue gas 24 can escape out from within cooker 10 by passing through a fluid permeable bottom 118 of bucket 116 and/or by passing through an annular clearance between an outer diameter of bucket 116 and an inner diameter of opening 114.

FIGS. 13-16 show cooker 10 additionally or alternatively comprising a skewer assembly (e.g., skewer assembly 120 or 120') disposed within reservoir 16. Skewer assemblies 120 and 120' comprise a plurality of skewers 122 (any number of skewers) extending upward from a base 124 or 124'. Base 124 and 124' comprise a plurality of spokes 126 (any number of spokes) to which skewers 122 are attached. Skewers 122 are horizontally adjustable along the spoke's length. In some examples, such adjustment is achieved by having a lower end 128 of skewers 122 be slidingly connected to spokes 126 via horizontally sliding joint 130.

Figure 17:
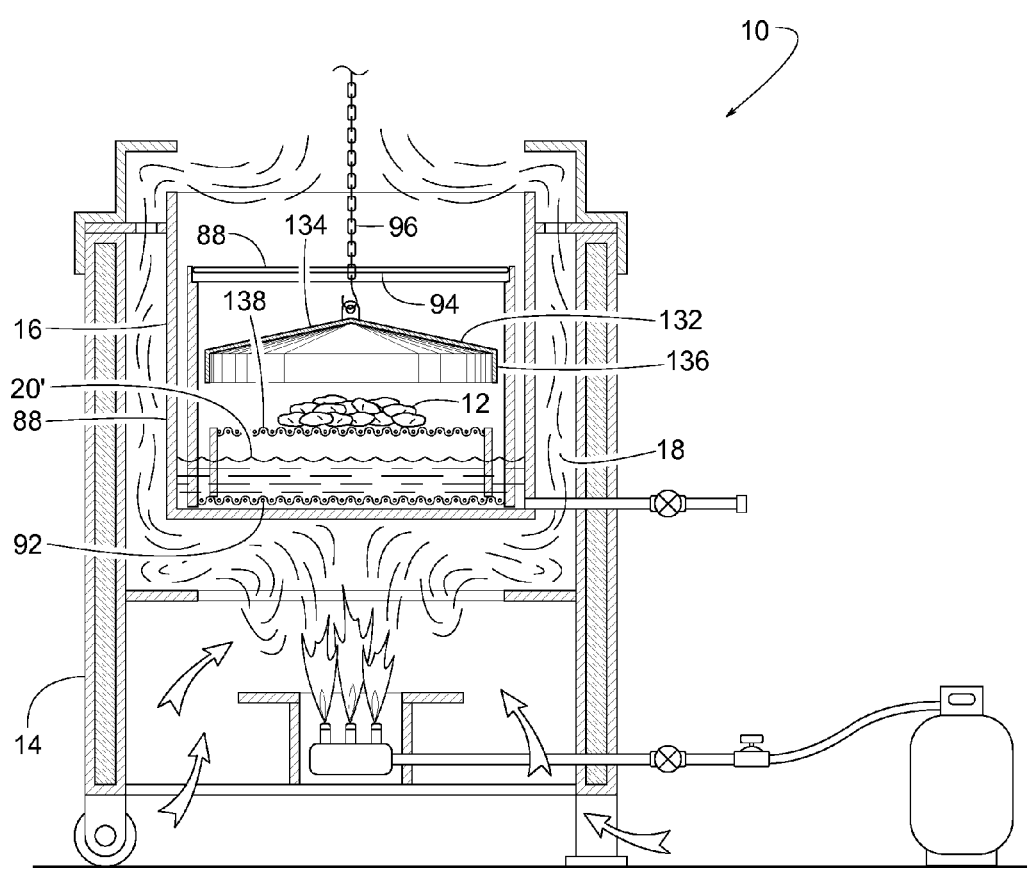
FIG. 17 is a cross-sectional view similar to FIG. 1 but showing the cooker in its steamer mode, a food-holder in its steamer position, and a steamer hood in use.

FIG. 17 shows cooker 10 additionally or alternatively comprising a steamer hood 132 that can be used for steaming food items 12. In some examples, steamer hood 132 comprises a cover 134 with a condensate drip rim 136 extending downward from cover 134. In some uses, food items 12 are placed on a food-supporting surface (e.g., on bucket bottom 92 of food holder 88 or in the form of an elevated tray 138), and food holder 88 is configured in its steamer position (FIG. 17), wherein food-supporting surface 92 or 138 is positioned above a liquid level 20' in reservoir 16. Alternatively, food holder 88 can be configured in a deep fryer position, wherein food-supporting surface 92 is below liquid level 20' in reservoir 16. Note: cooker 10 is selectively configured in a steamer mode when liquid 20 is water, and cooker 10 is selectively configured in a deep fryer mode when liquid 20 is oil. With food holder 88 in the steamer position and cooker 10 configured in the steamer mode, food items 12 are steamed by positioning steamer hood 132 within food holder 88 above food items 12. In some cases, holding steamer hood 132 suspended above food items 12 and within food holder 88 is accomplished using lifting device 96.

Figure 18:
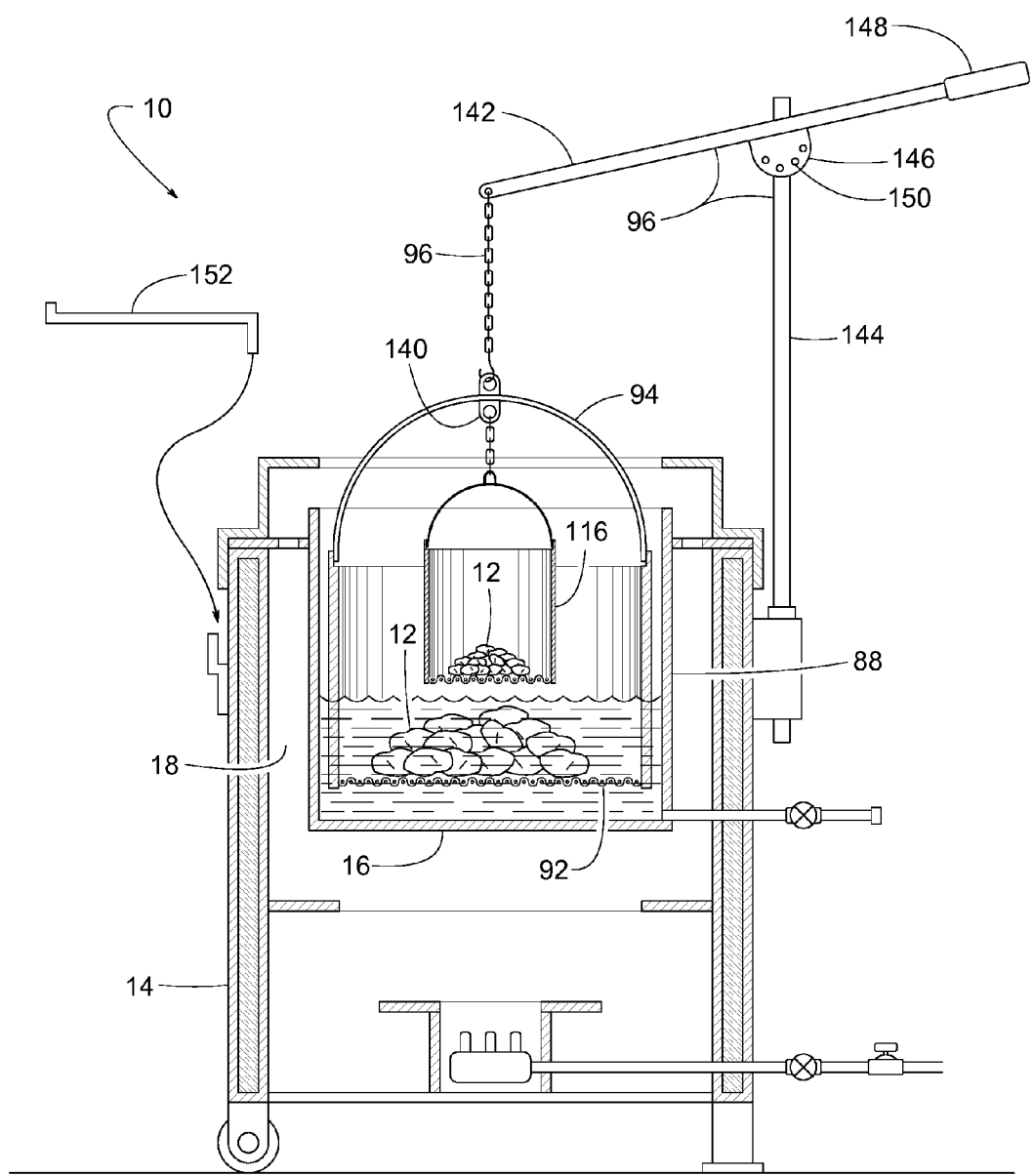
FIG. 18 is a cross-sectional view similar to FIG. 6 but further showing an example lifting device and an example add-table.
Figure 19:
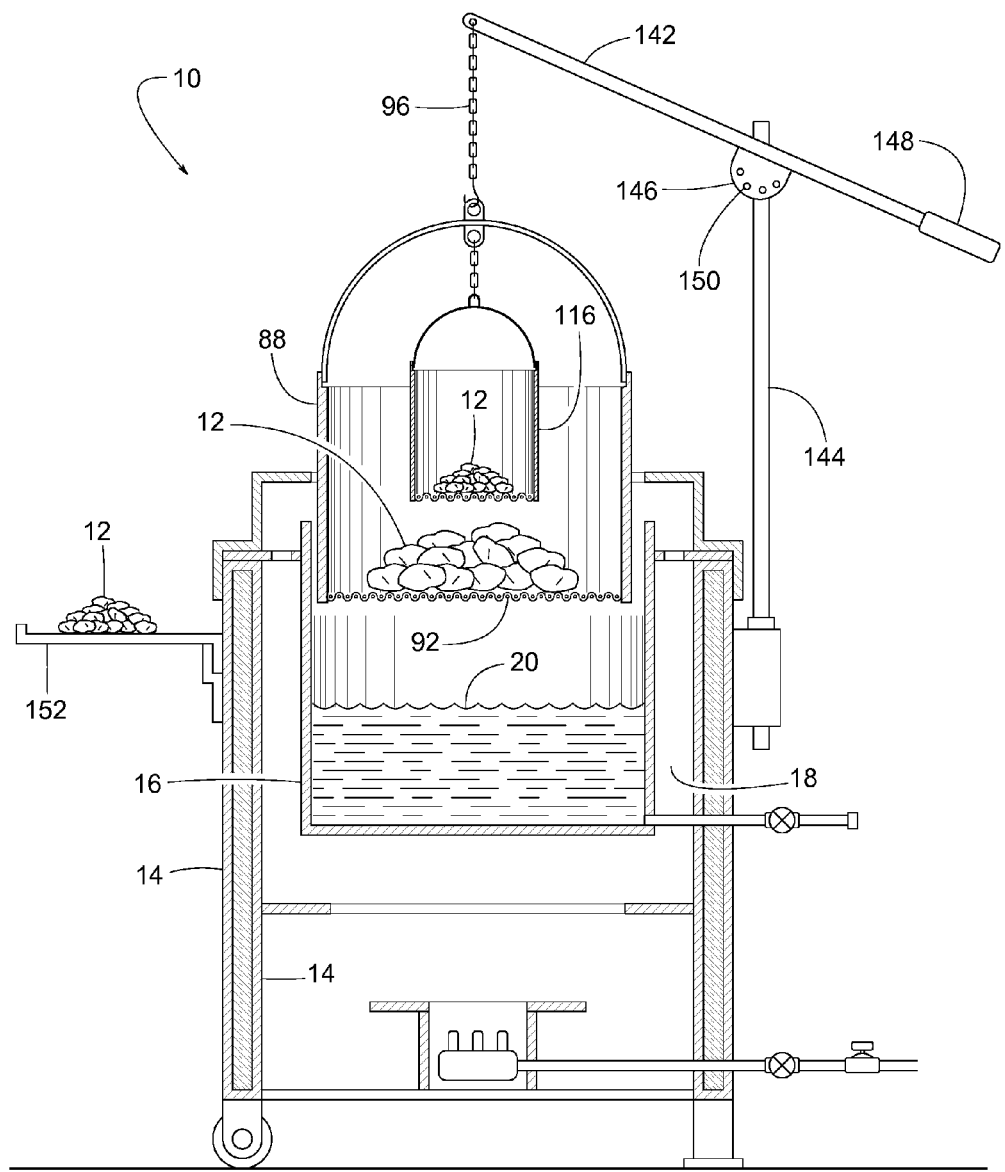
FIG. 19 is a cross-sectional view similar to FIG. 18 but showing the add-on table attached to the shell and the lifting device at an elevated position.

One example of lifting device 96 is shown in FIGS. 18 and 19. In the illustrated example, lifting device 96 suspends food holder 88, and bucket 116 is hung from a handle connector 140 of food holder 88. Lifting device 96 includes a manually operated lever 142 that pivots (relative to a support member 144) between a lowered position (FIG. 18) and a raised position (FIG. 19). In some examples, lifting device 96 includes a holding mechanism 146 wherein, after a user releases a handle 148 of lever 142, holding mechanism 146 holds lever 142 at selected angles. In some examples, holding mechanism 146 comprises a plunger selectively insertable in a plurality of holes 150 or detents.

In some examples, cooker 10 includes additionally or alternatively a table 152 that is removably attachable to shell 14. FIG. 18 shows table 152 removed, and FIG. 19 shows table 152 attached and supporting food items 12.

Figure 20:
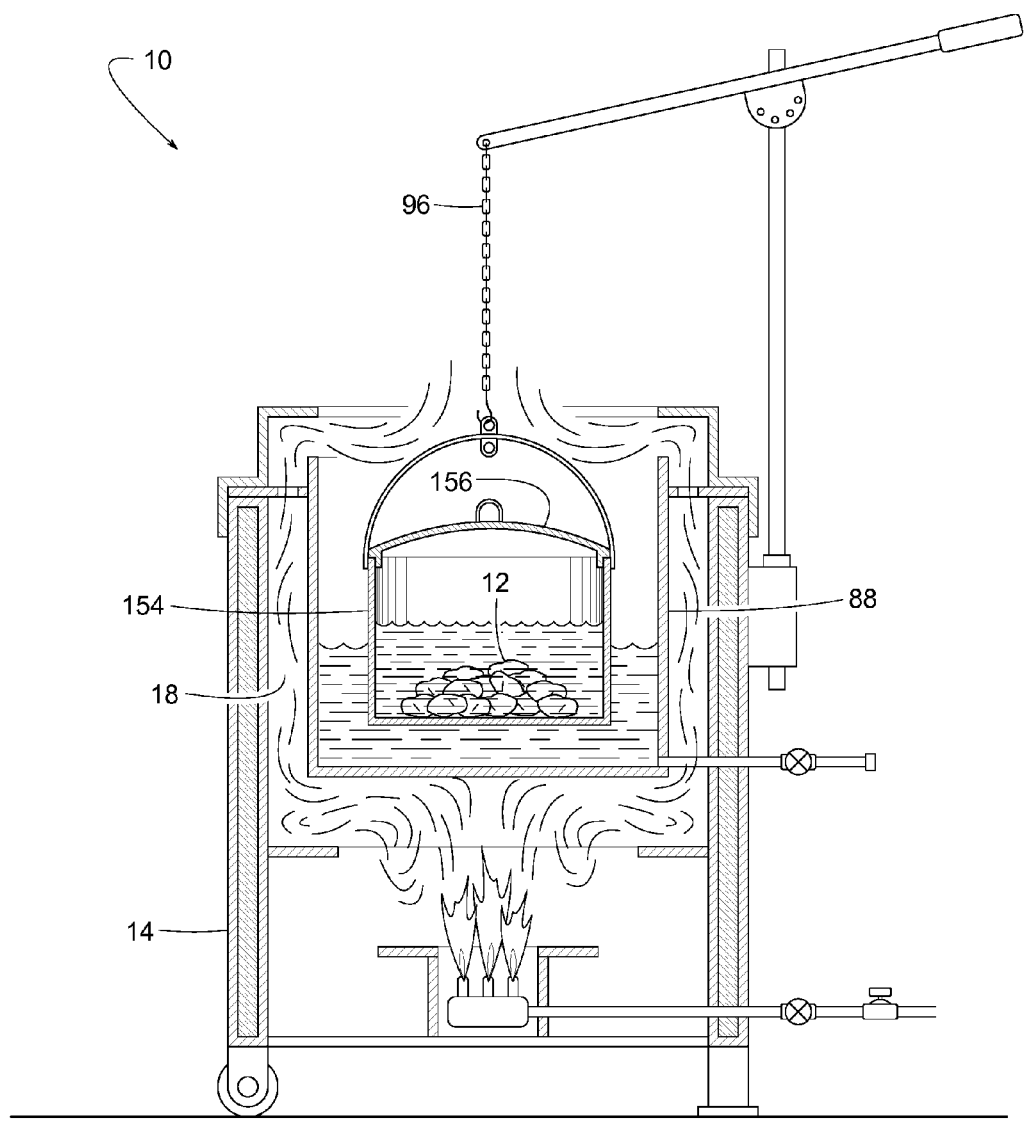
FIG. 20 is a cross-section view similar to FIG. 6 but showing a double-boiler operation.

FIG. 20 shows cooker 10 that in some examples includes a closed bottom bucket 154 with a lid 156 to provide a double-boiler operation, wherein bucket 4 is heated by water in reservoir 88, and food 12 is cooked in water in bucket 154.

Here are some additional points worth noting. In some examples, feet 66 and bracket 48 are such that they provide a removable dolly upon which shell 14 rests. Charcoal is another example a fuel capable of producing a fuel-fed flame. A screen is any fluid permeable structure through which a fluid may pass. Examples of burner 22 include, but are not limited to, a JETC20 Jet Burner-8" diameter, and a JETC32 Jet Burner-10" diameter, both of which are provided by Tejas Smokers of Houston, Tex. In some examples, shell 14, reservoir 16, and ring plate 44 are all comprised of stainless steel and welded to each other to create a single fabrication.

Although the invention is described with respect to a preferred embodiment, modifications thereto will be apparent to those of ordinary skill in the art. The scope of the invention, therefore, is to be determined by reference to the following claims:

The invention claimed is:
1. A cooker for cooking food items with heat from a fuel-fed flame and a current of flue gas from the fuel-fed flame, the cooker comprising:
 a shell containing a combustion chamber;

an invertible cooktop supported by the shell selectively at a grill position and a griddle position, the invertible cooktop comprising a griddle side and a grill side, the grill side comprising a plurality of ridges rendering the grill side less flat than the griddle side, the grill side facing up and the griddle side facing down when the invertible cooktop is in the grill position, the griddle side facing up and the grill side facing down when the invertible cooktop is in the griddle position, wherein the invertible cooktop defines a bucket-receiving opening therethrough; and a bucket extending through the bucket-receiving opening.

2. The cooker of claim 1, wherein the bucket has a fluid permeable bottom.

3. The cooker of claim 1, further comprising:
a burner with a nozzle projecting the fuel-fed flame into the combustion chamber;
a reservoir comprising a sidewall and a bottom, the reservoir being disposed within the shell to define an annular flue between the sidewall of the reservoir and an inner wall of the shell; and
with respect to the current of flue gas, the combustion chamber is upstream of the annular flue.

4. A cooker for cooking food items with heat from a fuel-fed flame and a current of flue gas from the fuel-fed flame, the cooker comprising:
a shell;
a reservoir extending within the shell, the reservoir defining an upper food-receiving opening, the reservoir and the shell defining an annular flue therebetween; and
a burner beneath the reservoir, the fuel-fed flame projecting from the burner and becoming the current of flue gas, the current of flue gas having a flow pattern comprising a first upward path toward the reservoir followed by a radially outward path toward the shell followed by a second upward path through the annular flue followed by a radially inward path overlapping the upper food-receiving opening followed by a third upward path away from the reservoir; and
a bucket disposed within the reservoir.

5. The cooker of claim 4, wherein the bucket has a closed bottom and a removable lid to provide a double-boiler operation.

6. The cooker of claim 4, further comprising:
a cooker-supporting surface;
a plurality of feet protruding downward from a lower edge of the shell and engaging the cooker-supporting surface; and
a combustion air inlet for the burner, the combustion air inlet being defined by the lower edge of the shell, the plurality of legs and the cooker-supporting surface.

7. A cooker for cooking food items with heat from a fuel-fed flame and a current of flue gas from the fuel-fed flame, the cooker comprising:
a shell comprising an inner wall;
a reservoir comprising a sidewall and a bottom, the reservoir being disposed within the shell to define an annular flue between the sidewall of the reservoir and the inner wall of the shell;
a ring plate extending between the sidewall of the reservoir and the shell, the ring plate defining a plurality of holes;
a combustion chamber beneath the reservoir and defined by the bottom of the reservoir;
a burner beneath the reservoir, the burner comprising a nozzle projecting the fuel-fed flame into the combustion chamber toward the bottom of the reservoir; and
with respect to the current of flue gas, the combustion chamber is upstream of the annular flue, and the annular flue is upstream of the plurality of holes in the ring plate.

8. The cooker of claim 7, further comprising:
an annular deflector, the annular deflector having a radially inner periphery, the reservoir having an upper rim, the radially inner periphery and the upper rim defining a flue gas discharge outlet therebetween, the flue gas discharge outlet facing radially inward from the annular deflector; and
with respect to the current of flue gas, the flue gas discharge outlet being downstream of the annular flue.

9. The cooker of claim 7, wherein the reservoir defines an upper food-receiving opening and a liquid opening through which a fluid flows selectively in and out of the reservoir, the liquid opening being in proximity with the bottom of the reservoir.

10. The cooker of claim 7, further comprising an annular baffle extending radially inward from the inner wall of the shell into the combustion chamber underneath the bottom of the reservoir.

11. The cooker of claim 7, wherein a lower edge of the shell defines a combustion air inlet below the bottom of the reservoir, the cooker further comprising a heat deflector encircling at least one of the burner and the fuel-fed flame, the heat deflector being interposed between the bottom of the reservoir and the combustion air inlet.

12. The cooker of claim 7, wherein the shell further comprises an outer wall, the inner wall and the outer wall define a gap therebetween that is substantially cylindrical, wherein the cooker further comprises a thermal insulator disposed within the gap.

13. A cooker for cooking food items with heat from a fuel-fed flame, with heat from a current of flue gas from the fuel-fed flame, and with heat from a heated liquid that has been heated by the fuel-fed flame and the current of flue gas, the cooker comprising:
a shell comprising an inner wall;
a reservoir comprising a sidewall and a bottom, the reservoir containing the heated liquid to define a liquid level of the heated liquid, the reservoir being disposed within the shell to define an annular flue between the sidewall of the reservoir and the inner wall of the shell;
a combustion chamber beneath the reservoir and defined by the bottom of the reservoir;
a burner beneath the reservoir, the burner comprising a nozzle projecting the fuel-fed flame into the combustion chamber toward the bottom of the reservoir;
with respect to the current of flue gas, the combustion chamber is upstream of the annular flue;
a food holder having a food supporting surface, the food holder being selectively configured to a steamer position and a deep fryer position, the food supporting surface being above the liquid level when the food holder is in the steamer position, the food supporting surface being below the liquid level when the food holder is in the deep fryer position; and
a steamer hood that includes a cover with a condensate drip rim extending downward from the cover, the cover and the condensate drip rim being disposed within the food holder above the food supporting surface when the food holder is configured in the steamer position.

14. The cooker of claim 13, wherein the food holder is a bucket having a bucket bottom, and the food supporting surface is an elevated tray spaced above the bucket bottom.

15. The cooker of claim 13, wherein the food supporting surface is liquid permeable.

16. The cooker of claim 13, wherein the cooker is selectively configured in a steamer mode and a deep fryer mode, the heated liquid comprising an oil when the cooker is configured in the deep fryer mode, and the heated liquid comprising water When the cooker is configured in the steamer mode.

17. A cooker for cooking food items with heat from a fuel-fed flame and a current of flue gas from the fuel-fed flame, the cooker comprising:
   a shell comprising an inner wall;
   a reservoir comprising a sidewall and a bottom, the reservoir being disposed within the shell to define an annular flue between the sidewall of the reservoir and the inner wall of the shell;
   a combustion chamber beneath the reservoir and defined by the bottom of the reservoir;
   with respect to the current of flue gas, the combustion chamber being upstream of the annular flue;
   a burner beneath the reservoir, the burner comprising a nozzle projecting the fuel-fed flame into the combustion chamber toward the bottom of the reservoir; and
   a skewer assembly disposed within the reservoir, the skewer assembly comprising a plurality of skewers extending upward from a base, the base comprising a plurality spokes extending substantially horizontally, the plurality of skewers includes a skewer, the plurality of spokes includes a spoke, and the skewer being horizontally adjustable along a length of the spoke.

18. The cooker of claim 17, further comprising a horizontally sliding joint between the skewer and the spoke.

19. The cooker of claim 17, further comprising a main bucket disposed within the reservoir, wherein the skewer assembly is in the main bucket.

20. The cooker of claim 19, wherein the main bucket has a bucket bottom that is fluid permeable.

* * * * *